United States Patent
Hagward et al.

(10) Patent No.: US 11,173,554 B2
(45) Date of Patent: Nov. 16, 2021

(54) CUTTING TOOL

(71) Applicant: GKN Aerospace Sweden AB, Trollhättan (SE)

(72) Inventors: Tore Hagward, Trollhättan (SE); Anders Wretland, Västra Frölunda (SE)

(73) Assignee: GKN Aerospace Sweden AB, Trollhättan (SE)

( * ) Notice: Subject to any disclaimer, the term of this patent is extended or adjusted under 35 U.S.C. 154(b) by 35 days.

(21) Appl. No.: 16/615,507

(22) PCT Filed: May 22, 2018

(86) PCT No.: PCT/EP2018/063383
§ 371 (c)(1),
(2) Date: Nov. 21, 2019

(87) PCT Pub. No.: WO2018/215464
PCT Pub. Date: Nov. 29, 2018

(65) Prior Publication Data
US 2020/0086401 A1    Mar. 19, 2020

(30) Foreign Application Priority Data

May 22, 2017 (GB) .................................... 1708170

(51) Int. Cl.
*B23B 51/06* (2006.01)
*B23B 51/02* (2006.01)

(52) U.S. Cl.
CPC .............. *B23B 51/06* (2013.01); *B23B 51/02* (2013.01); *B23B 2250/12* (2013.01); *B23B 2251/443* (2013.01); *B23B 2260/072* (2013.01)

(58) Field of Classification Search
CPC .......... B32B 2250/12; B32B 2251/443; B32B 2260/072; B32B 51/042; B32B 51/06; B32B 51/0486
See application file for complete search history.

(56) References Cited

U.S. PATENT DOCUMENTS 2,322,894 A * 6/1943 Stevens .................. B23B 51/02
408/230
5,160,232 A * 11/1992 Maier .................... B23B 51/02
407/54

(Continued)

FOREIGN PATENT DOCUMENTS

CN    103157833 B    3/2016
DE    10144241 A1    4/2003
(Continued)

OTHER PUBLICATIONS

WO-2017089544-A1 Machine Translation, pp. 1-7 (Year: 2020).*
(Continued)

*Primary Examiner* — Nicole N Ramos
(74) *Attorney, Agent, or Firm* — Bejin Bieneman PLC

(57) ABSTRACT

A cutting tool comprises at least one cutting edge and at least one relief surface adjacent thereto. The relief surface is arranged to provide clearance behind the cutting edge between the cutting tool and a workpiece and comprises one or more grooves arranged to communicate, in use, a cutting media across the relief surface.

19 Claims, 6 Drawing Sheets

(56) References Cited

U.S. PATENT DOCUMENTS

| | | | |
|---|---|---|---|
| 6,030,155 A * | 2/2000 | Scheer | B23B 51/02 408/59 |
| 6,524,036 B1 * | 2/2003 | Kolker | C21D 9/22 409/131 |
| 9,144,845 B1 | 9/2015 | Grzina | |
| 2011/0116884 A1 * | 5/2011 | Li | B23B 51/02 408/223 |
| 2012/0082518 A1 * | 4/2012 | Woodruff | B23C 5/207 407/11 |
| 2013/0302102 A1 * | 11/2013 | Green | C23C 30/005 408/144 |
| 2014/0255112 A1 * | 9/2014 | El-Wardany | B23P 15/42 407/13 |
| 2016/0001381 A1 | 1/2016 | Lach | |
| 2016/0059323 A1 * | 3/2016 | Riester | B23B 51/06 408/57 |
| 2016/0175944 A1 * | 6/2016 | Lyu | B23B 51/02 407/54 |
| 2017/0341159 A1 * | 11/2017 | Ogawa | B23B 51/00 |

FOREIGN PATENT DOCUMENTS

| | | | | |
|---|---|---|---|---|
| EP | 1396303 A2 | | 3/2004 | |
| JP | S64 2808 A | | 1/1989 | |
| JP | 2006239829 A | * | 9/2006 | |
| JP | 2009083092 A | * | 4/2009 | |
| JP | 2010214545 A | * | 9/2010 | |
| JP | 2013193159 A | * | 9/2013 | |
| WO | WO-0067939 A1 | * | 11/2000 | B23B 51/02 |
| WO | 2015139680 A2 | | 9/2015 | |
| WO | WO-2017089544 A1 | * | 6/2017 | B23B 51/06 |

OTHER PUBLICATIONS

DE-10144241-A1 Machine Translation, pp. 5-9 (Year: 2020).*
JP 2013-193159 Machine Translation (Year: 2021).*
International Search Report and Written Opinion for PCT/EP2018/063383 dated Sep. 25, 2018 (24 pages).

* cited by examiner

CUTTING TOOL

CROSS-REFERENCE TO RELATED APPLICATIONS

This application is a national stage of, and claims priority to, Patent Cooperation Treaty Application No. PCT/EP2018/063383, filed on May 22, 2018, which application claims priority to Great Britain Application No. GB 1708170.4, filed on May 22, 2017, which applications are hereby incorporated herein by reference in their entireties.

BACKGROUND

When in use, cutting tools are moved relative to, and brought into contact with, a workpiece. A cutting tool is selected so as to have a greater hardness than the workpiece material to be cut. As the cutting tool moves across or through the workpiece, material is removed.

Friction between the workpiece and the tool leads to an increase in the temperature of the cutting tool and also the workpiece itself. High machining temperatures are generally undesirable and present a number of problems.

For example, high temperatures can lead to chipping or damage to the cutting tool itself as stresses increase within the tool as temperature rises. High temperatures can also lead to expansion of the tool and the workpiece, possibly at different rates, leading to inaccuracies in machining and reduced tolerances.

In addition to the problems caused by excessive heat in the machining operation, wear is also a significant issue. Wear is caused by the sliding contact between the cutting tool and the workpiece surface during the machining operation. High levels of wear are undesirable because this necessitates tool replacement which, for extremely hard tools, can be very expensive. It also causes machining downtime whilst the tools are replaced, increasing manufacturing costs.

In order to address these problems a cutting fluid, or more generally cutting media, is used in machining to provide lubrication between cutting tools and the workpiece. The cutting media serves a number of purposes. Firstly, and most importantly the cutting media acts as a lubricant allowing the cutting tool to pass across and through the workpiece material with minimal friction. This in turn reduces heat generation. The cutting media also acts as a coolant collecting heat from the cutting zone and conveying it away from the tool and workpiece. Additionally the cutting media acts to carry material that has been cut from the workpiece (for example in the form of swarf) away from the cutting zone. This allows for continuous cutting and prevents blocking or jamming of the tool.

Particular parts of cutting tools are more susceptible to heat related damage than others and this is particularly so with drill bits where tangential speeds at the periphery of the tool can create high temperatures in parts of the tool that may be the thinnest and most fragile.

In drill bits, for example, sophisticated channels may be formed to allow coolant to be successfully communicated to the tip of the bit so as to achieve the benefits outlined above. In a drill bit, conventional coolant supplies allow a highly stressed tip surface of the drill bit to be cooled and the lifetime of the drill bit to be extended. To allow the drill bit to be as strong as possible the opening of the coolant channel is positioned in the tip surface of the drill bit away from the cutting edge. This maintains the drill's strength whilst still allowing coolant to be supplied.

Numerous cutting media delivery systems are available in the art which achieve the advantages set out above for various machining operations.

However, the present inventors have established an unconventional approach to further enhance the benefits of supplying a cutting media to a cutting tool. The inventors have also established an apparatus that more effectively enables cutting media to reach the cutting edges, corner edges and drill margins. An invention described herein results in an increased lifetime of the cutting tool and therefore an increase in productivity due to less frequent replacement of the cutting tool.

SUMMARY

The present disclosure relates particularly, but not exclusively, to cutting tools used in drilling or boring processes. It will be recognised that the disclosure is also applicable to other forms of machining.

Aspects of the invention are defined in the accompanying claims.

According to a first aspect there is provided a cutting tool comprising at least one cutting edge and at least one relief surface adjacent thereto, wherein the relief surface is arranged to provide clearance behind the cutting edge between the cutting tool and a workpiece, and wherein the relief surface comprises one or more grooves arranged to communicate, in use, a cutting media across the relief surface.

Unconventionally, a relief surface behind a cutting edge is provided with one or more grooves or recesses which are arranged to communicate a cutting media across the relief surface. Purposely providing flow paths for a cutting fluid or media is counterintuitive because the grooves extend into the relief surface which is the support structure for the cutting edge itself.

However, the inventors have established that the benefits of adapting a relief surface to provide grooves outweigh any disadvantages of interfering with the thickness of the cutting tool proximate the cutting edge.

As described herein, cutting media supplied to the cutting zone can be distributed across the relief surface by means of the grooves.

The term 'groove' is intended to refer to a modification to the relief surface to allow a cutting media to be communicated across the surface. This may be in the form of a channel, depression, valley or the like extending into the relief surface and along which a cutting media can be communicated.

The cutting tool may have a proximal end for connection to a drive mechanism and a distal end where the cutting tip is located. The distal cutting tip may comprise a number of cutting portions of which a cutting edge forms a leading part. Each cutting edge extends from a central region of the cutting tip and intersects with the periphery of the cutting tool. In use, the cutting edge engages with the workpiece to cause the cutting action. The cutting edge is structurally supported by the cutting portions.

The point at which the cutting edge intersects with the periphery of the cutting tool defines a point or 'corner' of the tool. In a rotating tool, such as a drill, this corner experiences the highest tangential speed during the cutting operation.

The cutting tool may further comprise one or more channels extending through the cutting tool from the proximal end to the distal tip. The channel is advantageously arranged or configured to communicate a cutting media, such as a cutting fluid, to the end of the cutting tool and specifically to a relief surface of the cutting tool. Advantageously all or part of the channel intersects with the relief surface proximate to the leading edge.

Advantageously, at least one groove intersects with an opening of the channel at a relief surface. Thus, the cutting media can be introduced directly onto the relief surface adjacent to the cutting edge. Furthermore, the cutting media can be communicated from the channel into the at least one groove for further communication across the relief surface.

The groove may advantageously extend into the relief surface, i.e., forming a passage below the normal outer surface line of the relief surface.

The relief surface may be a single smooth continuous surface, or alternatively may be sub-divided into a primary relief surface adjacent to the cutting edge and a secondary relief surface adjacent to the primary relief surface. When a single relief surface is used, the surface of the relief surface may be curved, i.e., a continuous curved surface as opposed to two surfaces angled relative to each other.

When a single continuous surface is used the channel is advantageously arranged to intersect with a portion of the relief surface proximate to the cutting edge, i.e., within a half of the relief surface proximate to the cutting edge. All or part of the channel may intersect in this way.

The cutting edge defines a leading edge of the cutting portion in a direction of a cutting operation and a secondary relief surface defines a trailing surface in a direction of a cutting operation. The primary relief surface is effectively disposed between the two.

Each cutting portion may further comprise a third or tertiary relief surface adjacent to the secondary relief surface and trailing the secondary relief portion in a direction of cutting operation. Thus, the clearance between the workpiece and the periphery of the cutting tool can be divided into 3 sections at different angles. This increases the clearance volume allowing additional cutting media to flow. When more than one relief surface is used, each relief surface may be curved.

The channel opening may intersect with one of the primary relief surface or the secondary relief surface. Advantageously, the channel opening may intersect with a line of intersection between a primary relief surface and secondary relief surface, thus cutting media can be simultaneously directed across both the primary and secondary relief surfaces. The cutting media being directed to the primary relief surface may then pass into the grooves for communication across the primary relief surface. Cutting media directed to the secondary relief surface may pass across the secondary relief surface and into the clearance volume.

Alternatively, the channel opening may offset from the line of intersection of the primary relief surface and secondary relief surface towards the leading edge.

The channel opening may be positioned midway between the cutting tip and an outer peripheral edge of the cutting tool.

The cutting tool may, in one example, be a rotary driven cutting tool such as a drill bit.

The point at which the cutting media carrying channel intersects with a relief surface may be chamfered or contoured with a radius to smoothly direct media in a desired direction. The perimeter of the opening may have different radii around its perimeter so as to actively direct cutting media in predetermined directions. For example the radii may be arranged so that more cutting media is directed towards a primary relief surface than a secondary relief surface to enhance advantageous effects.

The opening of the channel may be contoured or chamfered as it intersects with the respective grooves in a relief surface.

The plurality of grooves may independently intersect with an opening of a channel to cause cutting media to be distributed between a plurality of grooves. In effect the channel acts as a manifold for cutting media distribution. The grooves themselves may have different depths to communicate different volumes of cutting media, i.e., the grooves may be non-uniform in depth, profile and width. Temperatures during a cutting operation can thereby be accurately controlled through cutting fluid distribution control.

Advantageously adjacent relief portions in the direction of the cutting operation are incrementally angled with respect to a plane perpendicular to the elongate axis of the cutting tool such that successive relief surfaces have greater angles to the plane than a preceding relief surface.

Each cutting portion may further comprise a substantially helical flute extending from the distal tip towards the proximal portion and adapted in use to communicate material from the cutting edge away from the tip. This additionally allows cutting media and any hot gases or the like to be removed from the cutting zone.

Each helical flute may further comprise a primary margin arranged along a periphery of each helical flute and arranged to strengthening the peripheral portion of the flute. Such a primary margin may extend from the corner of the cutting portion described above and along the periphery of the helical flute.

Alternatively, the flute may be straight, i.e., aligned with the elongate axis of the cutting tool. This is known as a straight flute cutting tool. In effect the angle of the flute is zero.

Each cutting portion may further comprise a secondary margin, wherein the secondary margin extends substantially parallel to the primary margin (in a helix) and protrudes from the side of the radially outermost surface of the body of the cutting tool. The radial extension of the protrusion of the secondary margin may be smaller than or equal to the primary margin.

One, some or all of the grooves may intersect with a radially outermost periphery of a relief surface. Thus cutting media can be communicated to the periphery of the tool. Some grooves may reduce (taper) in depth so as to introduce cutting fluid onto the relief surface. The cutting media may then flow as a film across the relief surface towards the outer periphery.

Advantageously at least one of the grooves is arranged to intersect with a radially outermost periphery of a relief surface proximate to the corner. As discussed above the corner is highly stressed and prone to high temperatures. Communicating cutting media close to the corner reduces temperature, improves lubrication and prevents chipping, wear and damage.

The groove may intersect with the radially outermost periphery of the relief surface at a distance from the corner edge which depends upon the angle of the relief surface adjacent to the cutting edge and the angle at which the flute extends with respect to the elongate axis of the cutting tool. The straighter the flute is, the closer the intersection of the groove with the outermost periphery of the relief surface may be to the corner edge.

At least one of the grooves may intersect with the radially outermost surface of a relief portion between the primary and secondary margins described above (or behind a primary margin in a direction of rotation where only one margin is present). Thus cutting media can be communicated directly into the flute to communicate material efficiently away from the cutting zone.

At least one groove may be arranged to extend away from the cutting edge i.e. towards a trailing edge of a relief surface. Cooling of the trailing edge can then also be controlled.

The cross-sectional shape of grooves may be any suitable shape and may be non-uniform along the length of a groove. For example, the cross-sectional shape of the at least one groove may be substantially semi-circular. Alternatively, the cross-sectional shape of the at least one groove may be rectangular or square.

Modern laser cutting or additive manufacturing techniques advantageously allow complex groove layouts, depths, widths and profiles to be formed.

Furthermore, the surface roughness inside a groove may be selected to a predetermined roughness average ($R_a$). The surface roughness may be non-uniform along the length and/or width of the groove. Surface roughness may be selected to control fluid flow and heat transfer characteristics of the or each groove.

The surface roughness of the groove may be greater at one end than another end and/or greater at an edge of the groove than the centre of the groove. The varying surface roughness within the groove may be achieved by applying a coating to the inside of the groove. For example, a coating such as titanium nitride or a suitable lacquer may be used to control the heat transfer and/or the surface roughness.

Advantageously one or more grooves may be formed so as to have a shape or path that is complimentary to the shape of the cutting edge. A uniform separation of all or part of the groove and cutting edge may be provided. Such a layout optimises heat transfer by aligning a groove with the cutting edge whilst maintaining the strength of the cutting edge.

For example, a plurality of adjacent grooves may each have at least a part of their path corresponding to the shape of the cutting edge.

Each groove may be adapted in a variety of ways to control the cooling effect. For example, each groove may have a uniform cross-sectional shape along its length. Each groove may have a zig-zag or serpentine profile viewed from an end of the tool. Similarly the walls of the groove may equally be adapted to optimise heat transfer and flow rate.

As discussed above with regard to the corner edge, the minimum distance between the edge of the at least one groove and the cutting edge is dependent on the geometry of the tip of the cutting tool.

In some examples, one or more grooves may intersect with the cutting edge itself in order to directly supply the cutting media to the cutting edge.

Viewed from another aspect there is provided a cutting tool comprising at least one cutting edge and at least one relief surface adjacent thereto wherein the relief surface is arranged to provide clearance behind the cutting edge between the cutting tool and a workpiece, and wherein the relief surface comprises a textured surface arranged to communicate, in use, a cutting media across the relief surface.

The term 'textured surface' is intended to refer to a modification to an otherwise smooth or un-interrupted relief surface. The texture may be in the form of a series of recesses extending into the surface with predetermined cross-sectional shapes or alternatively raised portions extending from the surface, again with predetermined cross-sectional shapes. A combination of both may also be applied to the relief surface. Still further a distribution of protuberances or cavities across the relief surface may also achieve the textured surface.

For example, the textured surface may be formed by a series of repeating shapes extending into the surface and in use provides a porous surface to the relief surface across which cutting media may flow.

Viewed from another aspect there is provided a tool comprising at least one cutting portion, each cutting portion comprising: a cutting edge; a tip surface comprising a relief surface adjacent to the cutting edge; a channel extending through the length of the tool and configured to communicate, in use, a cutting media, wherein at least part of a distal end of the channel has an opening at the relief surface adjacent to the cutting edge; the relief surface further comprises one or more grooves extending from the opening; and wherein all or part of at least one of the grooves extends in the relief surface adjacent to the cutting edge.

The relief surface may advantageously be subdivided into a primary relief surface proximate to the cutting edge and a secondary relief surface trailing the primary relief surface in a cutting direction, and wherein all or part of at least one of the grooves extends in the primary relief surface adjacent to the cutting edge.

The tool may be a drill bit.

Viewed from yet another aspect there is provided a computer numerically controlled (CNC) machining centre, and a method of operating the same, incorporating a cutting tool or tool as described herein.

Viewed from a still further aspect there is provided a method of manufacturing a cutting tool, wherein the method of manufacturing comprises: forming at least one groove to extend to a peripheral edge of the cutting tool from an intersection of a channel extending through the length of the cutting tool and a tip surface of the cutting tool, wherein the tip surface of the cutting tool comprises a relief surface adjacent to the cutting edge and one of the at least one grooves extends along the relief surface cutting edge.

The tool may for example be formed by a grinding process or any erosion method such as laser beam machining, abrasive water jet machining or otherwise by means of a chemical material removal method.

A drill bit may be formed or manufactured according to the method.

BRIEF DESCRIPTION OF THE DRAWINGS

The present teachings will now be described, by way of example only, with reference to the following figures in which like parts are depicted by like reference numerals.

Figure 1A:
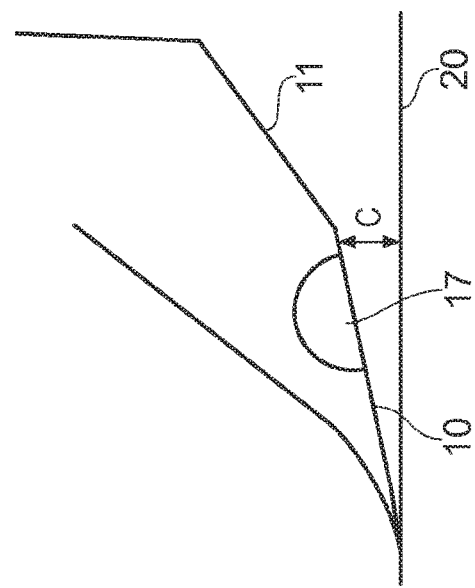
FIGS. 1A and 1B show side views of a cutting tool.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope defined by the appended claims.

As used in this specification, the words "comprises", "comprising", and similar words, are not to be interpreted in an exclusive or exhaustive sense. In other words, they are intended to mean "including, but not limited to".

It will be recognised that the features of the aspects of the invention(s) described herein can conveniently and interchangeably be used in any suitable combination.

DETAILED DESCRIPTION

The present teaching relates to a cutting tool and a method for manufacturing such a tool. The embodiments described below apply to a rotary cutting tool, namely a drill bit. It will be recognised that other tools as discussed herein may be applicable.

According to the present teaching, a cutting tool is provided with improved performance and an improved lifetime. When used, the cutting tool allows for increased productivity, due in part to improved transfer of cutting media to and away from the tip of the cutting tool and more specifically to particular regions of the cutting tool.

Referring to the figures, FIG. 1 shows a cutting tool. In the present example, the cutting tool is a rotary cutting tool in the form of a drill bit 1 for drilling a hole in a workpiece.

In other examples, a cutting tool according to the present teaching can be used for other applications such as reaming or milling. More specifically, it will be recognised that the teaching provided herein can be applied to any tool which comprises a relief surface extending from a cutting edge, i.e., a 'wedge-like' geometry where thermal control of the cutting zone is required.

Returning to the present example, the drill bit 1 is generally cylindrical in shape. This can be seen in FIGS. 1A, 1B and 1C where a side and axial view of the tip of the drill bit are shown.

Figure 1B:
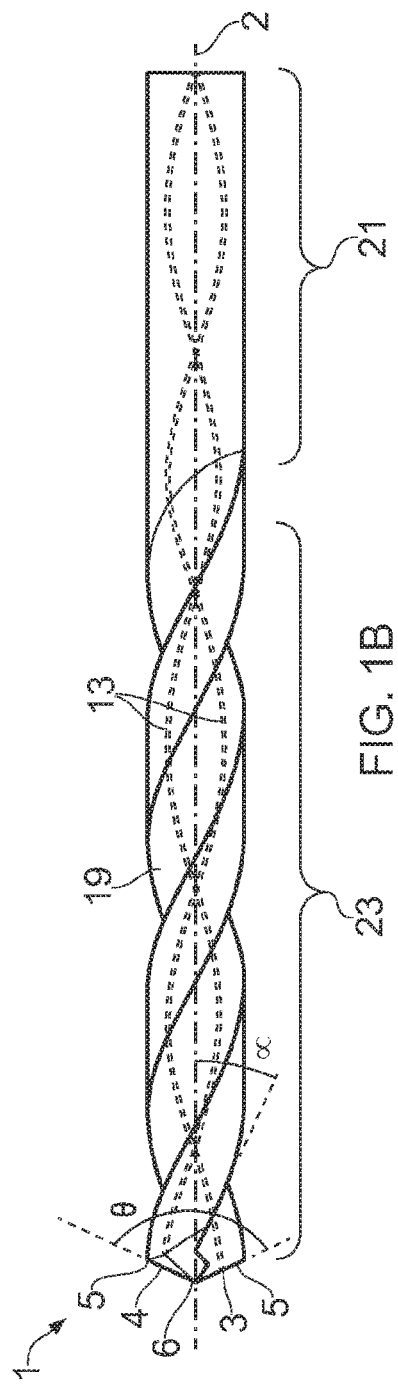

FIG. 1A is an enlarged view of the end of the cutting tip viewed from the side. FIG. 1B shows a side view of the full length of the drill bit showing the cutting tip and the proximal end which is inserted into a drill chuck. FIG. 1B also illustrates the internal cutting media channels (shown in dotted lines) described further below.

Referring to FIGS. 1A and 1B, the drill bit 1 has a central axis 2 extending from a proximal end when the bit is connected to a source of rotation (a chuck or the like) and a distal end where the cutting action takes place. In use, the drill bit 1 is caused to rotate about this central axis 2.

In the present example, the drill bit 1 has two cutting portions 3, 4. The cutting portions 3, 4 are at the distal end of the drill bit 1 and meet at a tool point 6. The tool point 6 is part of a tip 22 of the drill bit 1. In the present example, each cutting portion 3, 4 extends radially from the centre of the drill bit 1 to the outer periphery of the drill bit 1. In the present example, the drill bit 1 has rotational symmetry about the central axis 2 of an order equal to the number of cutting portions, i.e., in this example, two.

In the interest of conciseness, and due to the rotational symmetry of the drill bit 1, the features of a single cutting portion 3 will be described hereinafter.

The cutting portion 3 has a cutting edge 5, i.e., the edge that initiates the cutting of the workpiece material. The cutting edge 5 extends radially from the centre of the drill bit 1 at the tool point 6 to a corner edge 7 of the cutting portion 3 at the periphery of the drill bit 1. In the present example, the cutting edge 5 has a curved profile. It will be recognised that the precise shape of the cutting edge will vary depending on various parameters including, for example, the material which is being drilled.

Figure 1C:
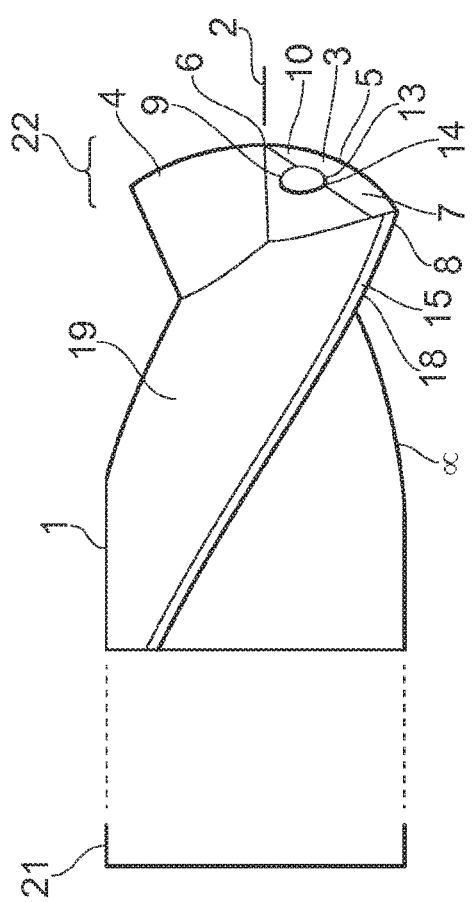
FIG. 1C show a cross-section through the cutting zone during a drilling operation.

FIG. 1C shows a cross-section of the cutting zone of the cutting tip during the cutting operation. The drill bit 1 comprises a primary relief surface 10 and a secondary relief surface 11. As shown, the groove is formed in the primary relief surface. As can be seen from FIG. 1C, the secondary relief surface 11 is at a greater angle with respect to the workpiece 20 than the primary relief surface 10. A groove 17 with a semi-circular cross sectional profile is shown.

The cutting edge 5 moves relative to the workpiece 20. FIG. 1C also shows the clearance C between the cutting tool and the workpiece surface. As described herein cutting media is ejected from the groove 17 and is communicated into the zone defined by the clearance C.

As shown in FIG. 1B, the cutting edge 5 is angled with respect to a plane perpendicular to the axis 2 along the length of the drill bit. The angle the cutting edge 5 makes with this plane is shown by angle θ.

Figure 2:
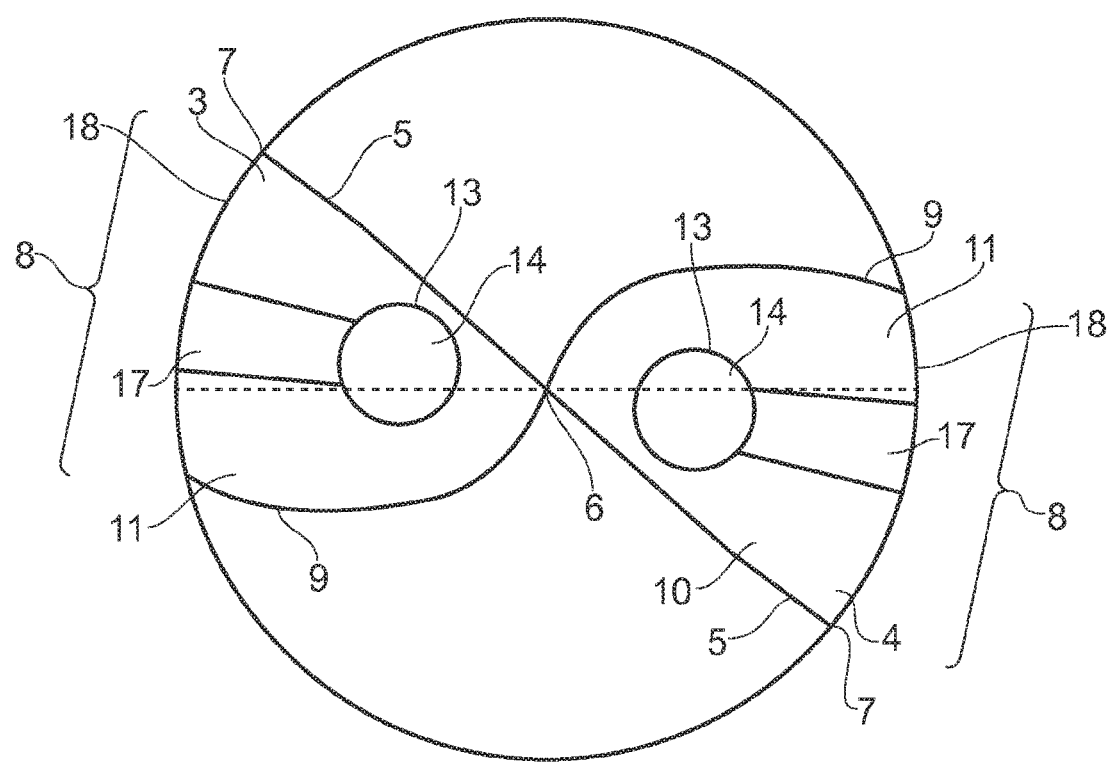
FIG. 2 is an axial view of the tip of a drill bit of FIG. 1.
Figure 3A:
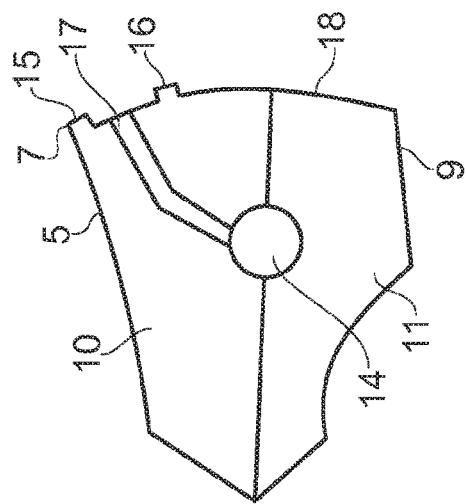
FIGS. 3A to 3E show alternative paths of grooves across the relief surface.
Figure 3B:
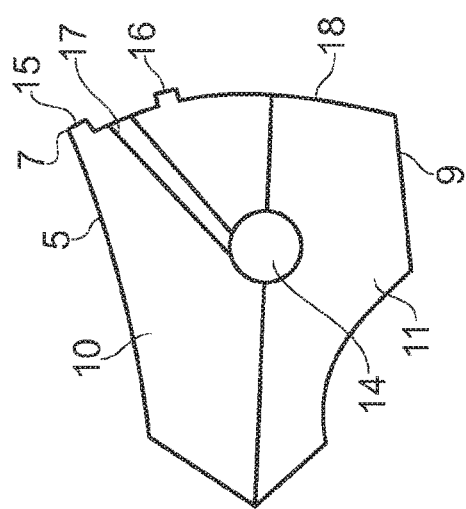
Figure 3C:
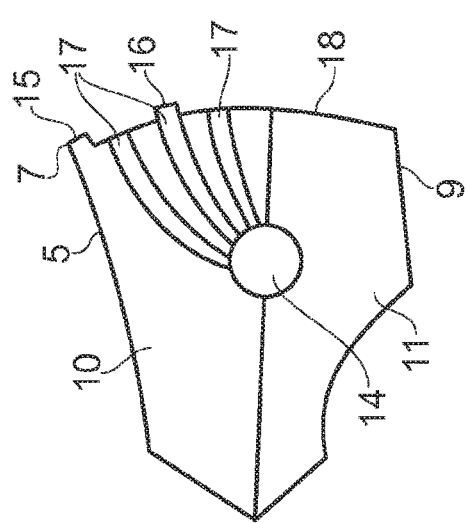
Figure 3D:
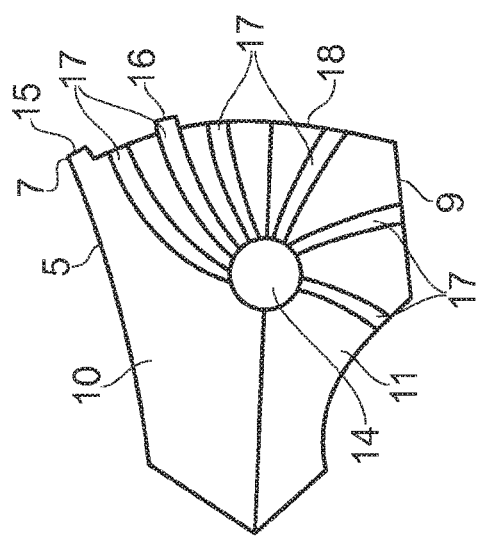
Figure 3E:
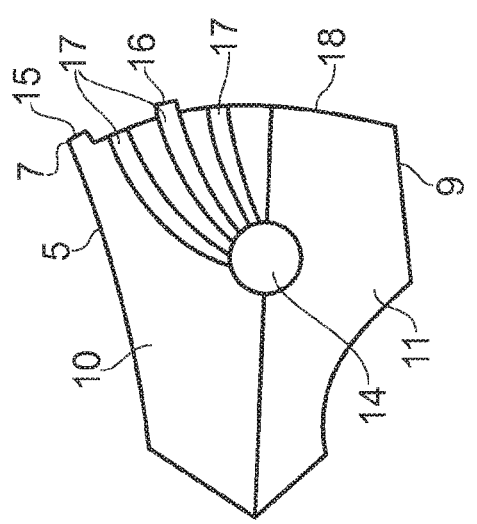

Referring to FIG. 2, the surface which extends from the cutting edge 5 is shown as tip surface 8. The tip surface 8 extends circumferentially from the cutting edge 5 to a trailing edge 9. The term 'trailing' is intended to refer to the fact that the edge 9 trails or follows the leading edge during the cutting operation.

The tip surface 8 extends radially to an edge of the drill bit 1 at an outer periphery of the drill bit 1. This edge will be referred to hereinafter as the tip surface edge 8. In this example, 'periphery' and 'peripheral' are used to mean the outermost part of the drill bit 1 when it is viewed in an axial direction, i.e. when viewing the tip 22 of the drill bit 1.

The cutting tool may comprise one of more relief surfaces depending on the implementation and cutting tool requirements. In the embodiment shown in FIG. 1C and FIG. 2, the tip surface 8 comprises a primary relief surface 10 and a secondary relief surface 11. The primary relief surface 10 is adjacent to the cutting edge 5. That is, the primary relief surface 10 is integrally formed with the cutting edge 5 and extends from it in a 'trailing' direction. The secondary relief surface 11 extends from the primary relief surface 10 to the trailing edge 9.

In the present example, the primary relief surface 10 is angled by a 'clearance angle' to create clearance (i.e. a space) between the distal surface of the tool and the workpiece during the drilling operation (see reference C in FIG. 1C). The primary relief surface 10 is angled such that the trailing edge 9 of the tip surface 8 is spaced from the surface of the workpiece 20 that has just been cut by the leading edge during rotation of the drill. The secondary relief surface 11 is angled at a greater clearance angle than the primary relief surface 10.

The primary relief surface 10 and secondary relief surface 11 are also angled in this way in order to provide clearance for the removal of material (swarf) behind or adjacent to the cutting edge 5. This also prevents abrasion of the surface against the workpiece or against swarf from the workpiece 20.

Referring to FIGS. 1A and 1B, it can be seen that from each cutting portion 3, 4 a flute 19 extends from the trailing edge 9 of the tip surface 8 helically down a portion of the drill bit 1. The term 'flute' is a term of the art referring to the helix of a drill bit. This portion will be referred to hereinafter as the helical portion 23.

The flute 19 is a generally semi-circular groove or recess in the radially outer surface of the body of the cutting tool.

The flute provides a passage for swarf and cutting media to be removed quickly and continuously from the cutting zone during the drilling operation. The angle at which the edge of the flute 19 extends with respect to the direction of central axis 2 is the rake angle α shown in FIG. 1A.

FIG. 1A also shows a channel 13 which extends through the length of the cutting portion 3 and has an opening at the tip surface 8 such that, in use, cutting media is able to flow along the channel out of the opening 14 and onto the tip surface 8 of the drill bit 1. Cutting media may be introduced into the channel at a proximate end of the cutting tool in a conventional manner. In the present example, the channel 13 has a circular shape when viewed in the axial direction.

FIG. 1A also shows the reinforcing margin that may optionally be used. As shown first margin 15 extends helically from the corner edge 7 of the cutting edge 5 down the side of the radially outer surface of the body of the drill bit 1. The first margin 15 is included in order to provide support to the corner edge 7 of the drill bit 1.

During the cutting operation the corner edge 7 is a highly stressed part of the drill bit 1 due to sustaining mechanical and thermal loads generated by the highest cutting speed at the outer peripheral edge of the drill bit 1 i.e. where the highest tangential speeds occur. When the drill bit 1 is in use, the first margin 15 travels along the inside of the generated hole in the workpiece 20. This results in a build-up of heat due to friction. The groove therefore conveniently directs the cutting media towards the corner and towards the margin 15 in order to counter the heat build-up due to friction.

The groove 17 is arranged across the relief surface as described herein to communicate cutting media (such as cutting fluid) from the channel towards the parts of the cutting tool that experience the highest temperatures and stresses. It is thus provided for the temperature at these regions to be more accurately controlled beneath acceptable levels. Furthermore, introducing the cutting media to these areas ensures optimal lubrication further reducing temperature and wear. Still further, the cutting media can effectively carry material that has been cut (swarf or the like) away from the region.

Thus, a groove 17 is arranged in the relief surface adjacent to the cutting edge and extends generally radially from the opening 14 of the channel 13 towards the tip surface edge 18. As discussed above the groove 17 provides a path for communicating the cutting media from the opening 14 of the channel 13. This results in cutting media being transported closer to the cutting edge than in previously existing cutting tools thus resulting in improved heat dissipation.

The trajectory or path of the groove 17 may generally follow the shape of the cutting edge 5 either entirely or in part (as described below). By directing the cutting media to follow the shape of the cutting edge 5 the cutting media can continuously cool the cutting edge 5. Mapping the channel's path onto the relief surface in this way reduces the distance between the cutting edge 5 and the groove 17 carrying the cutting media. Bringing the supply of cutting media (acting as a coolant) closer to the cutting edge 5 greatly enhances the cooling of the cutting edge 5.

An example of a drill bit is set out below:

In one example, the drill bit 1 has a tip 22 diameter of 8 mm with a tolerance class of h7 according to ISO286 and a shank 21 diameter of 8 mm with a tolerance class of h6 according to ISO286. The drill bit 1 may have a larger or smaller diameter than this depending on the application. All dimensions used hereinafter are for a drill bit 1 with a tip 22 diameter of 8 mm. If a different size drill bit 1 were to be used, the dimensions of parts of the drill bit 1 would be scaled accordingly as will be recognised by the skilled person.

The point angle θ may be anywhere between 180 to 90 degrees. In the present example, the point angle θ is approximately 118 degrees.

The helical portion 23 extends to a length of approximately 60 mm from the distal end of the cutting tool. The helical portion 23 is integrally formed with a shank 21 which extends a length of 40 mm from the end of the helical portion 23. The shank 21 is used to connect the drill bit 1 to the machine which causes the rotation of the tool when in use. It will be understood by the skilled reader that in other examples the dimensions of the helical portion 23 and shank 21 may be different from those given above. In the present example, the rake angle α is approximately 4 degrees. As discussed above, the flute may not helically extend along the cutting tool but may be straight, i.e. with a rake angle α of 0 degrees.

In other examples, the drill bit 1 may have more than two cutting portions. For example, the drill bit 1 may have three or four cutting portions. It will be recognised that drills are typically defined as two or three fluted (one flute one cutting portion). Drills with more than three cutting portions are called reamers (usually without any point and used to enlarge holes). It will further be recognised that the present disclosure may equally apply to reaming tools. Alternatively, the drill bit 1 may have only one cutting portion.

In other examples, a straight cutting edge 5 may be used. In still other examples, the cutting edge 5 may be made up of more than one straight cutting edge section; that is, the cutting edge 5 may be made up of two straight sections meeting at an angle.

In other examples, the tip surface 8 may comprise one relief surface or more than two relief surfaces. For example, the tip surface 8 may comprise a primary relief surface 10, a secondary relief surface 11 and a third or tertiary relief surface 12.

The relief surfaces may be 'step-less' meaning that a continuous surface may be provided with contours between regions of differing relief or clearance angles.

When more than one relief surface is used, the primary relief surface 10 may be at a shallower angle with respect to the horizontal than the secondary relief surface 11 and the secondary relief surface 11 may be at a shallower angle with respect to the horizontal than a third or tertiary relief surface 12 and so on.

A greater difference in angle of orientation of the primary relief surface 10 and secondary relief surface 11 leads to more cutting media exiting towards the secondary relief surface 11, away from the cutting edge 5.

When more than one relief surface is used on the drill bit 1, at least part of the opening 14 intersects with the primary relief surface 10 such that during use, the cutting media exits at the transition zone between the primary relief surface 10 and the secondary relief surface 11. In other examples none of the opening 14 may intersect with the primary relief surface 10.

In other examples, the rake angle α may be between 2 and 6 degrees. A higher rake angle α drill bit 1 is used when machining a workpiece made of soft metals and other low strength materials.

In other examples, the diameter of the opening 14 will depend on the viscosity of the cutting media but may, for example, be 0.2 mm or more. In other examples, the channel 13 may have a non-circular cross sectional shape. For example, the channel 13 may have an oval cross section or other profile.

In yet another example, coolant does not travel in a channel through the length of the drill bit 1 but is injected from the side of the drill bit 1. The grooves still allow the coolant to travel efficiently across the relief surface providing the advantages described herein.

The reinforcing margin may be any suitable width. A narrower margin will reduce the friction whilst a wider margin will provide greater mechanical strength to the corner of the cutting edge. A second margin on an opposing side of a flute to a primary margin may have a radial extension which is less than a primary margin.

The depth of the groove will depend, amongst other things, on the required cooling and cutting media density and viscosity. The groove 17 may be of varying width or depth along the length of the groove 17. In one example, the groove 17 is deepest at the point which it extends from the opening 14 or deepest at a point along the length of the groove 17. A deeper groove 17 results in increased rate of heat dissipation but leads to reduced mechanical strength. In one example, the groove 17 is widest at the point which it extends from the opening 14 or widest at the point at along the length of the groove 17.

The surface roughness within the groove may also be adapted according to the cooling requirements. The surface roughness of the groove 17 may vary within the groove 17 in a width or length direction of the groove. For example, in some examples the surface roughness of the groove 17 is greater at the edge of the groove 17 than the centre of the groove 17 and in other examples the surface roughness of the groove 17 is greater at the centre of the groove 17 than the edge of the groove. Additionally or alternatively in some examples, the surface roughness of the groove 17 is greater at the point of the groove which extends form the opening 14 than further down the length of the groove 17 or the surface roughness of the groove 17 is greater at a point along the length of the groove 17 than at the point adjacent to the opening 14. An increased surface roughness will lead to an increased rate of heat dissipation.

In the present example, the surface roughness of the groove may advantageously be less than 6.3 $R_a$ and may be substantially constant throughout the groove 17. The increased surface roughness in the groove 17 may be achieved by including a coating inside the groove 17.

As described above the groove or grooves 17 extend to the circumferential edge of the cutting portion 3. The path the groove(s) follow(s) may also be conveniently varied. For example, the groove 17 may be curved so as to approach the cutting edge 5 of the cutting portion 3 and extend generally parallel to it.

In other examples, the groove 17 may be straight or the groove 17 may have a curved portion which extends from the opening 14 and a straight portion which extends generally parallel with the cutting edge 5.

Examples of the paths grooves may have across the relief surface are shown in FIGS. 3A to 3E. Importantly in each example the channel introduces cutting media directly onto the primary relief surface behind the cutting edge. In some examples grooves may additionally extend in a trailing direction along the secondary relief surface (see FIGS. 3D and 3E).

The grooves may alternatively be straight, curved or "kidney" shaped. Such complex shapes could be achieved using non-traditional concepts such as pressed grooves from primary manufacturing or subsequent material removal by non-conventional concepts like laser ablation; ultra-sonic machining; chemical (etch) or additive manufacturing techniques.

In other examples, either one or both of the edges of the groove 17 may be manufactured in a "zig-zag" shape. This would result in an increased surface area for heat dissipation.

FIGS. 4A to 4D further illustrate how each groove may be adapted.

Figure 4A:
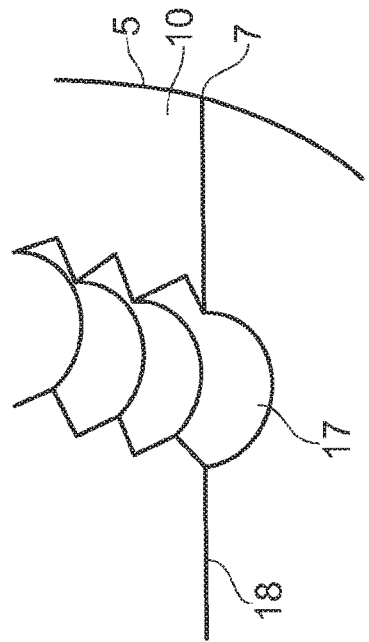
FIGS. 4A to 4D show alternative paths of grooves across a relief surface.
Figure 4B:
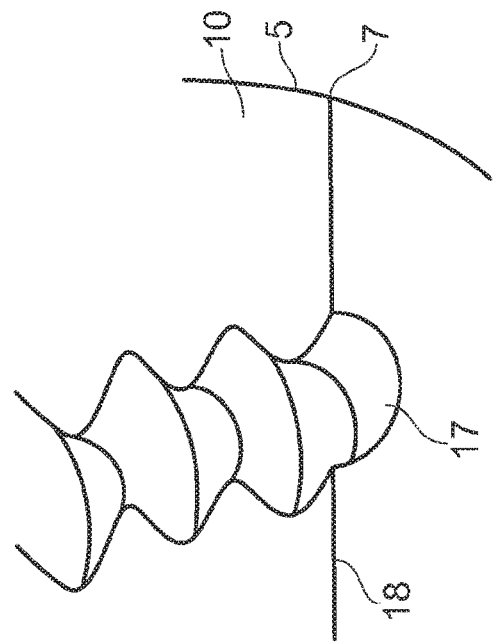
Figure 4C:
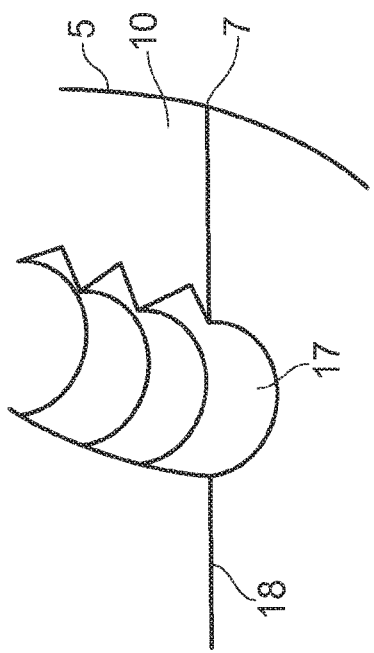
Figure 4D:
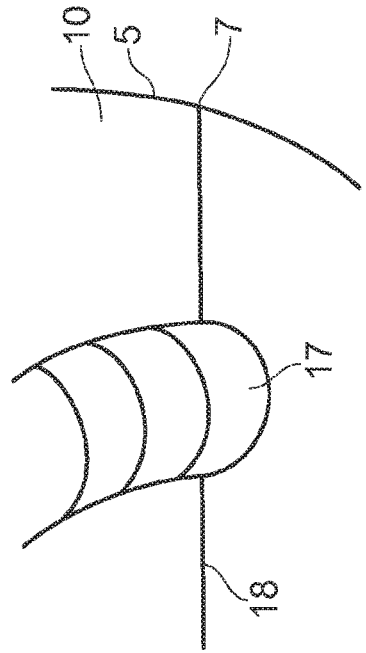
Figure 5A:
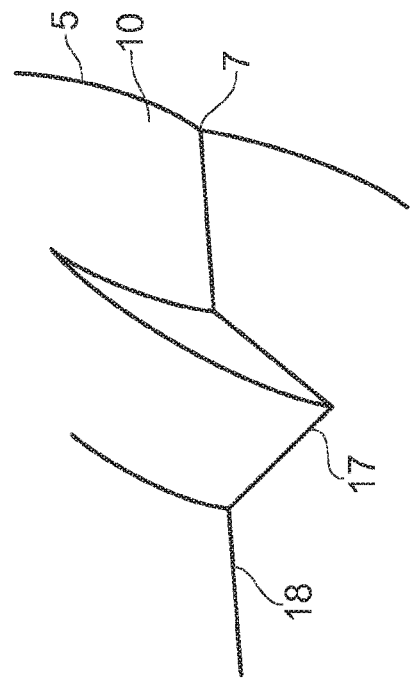
FIG. 5A to 5D show alternative cross-sections of grooves.
Figure 5B:
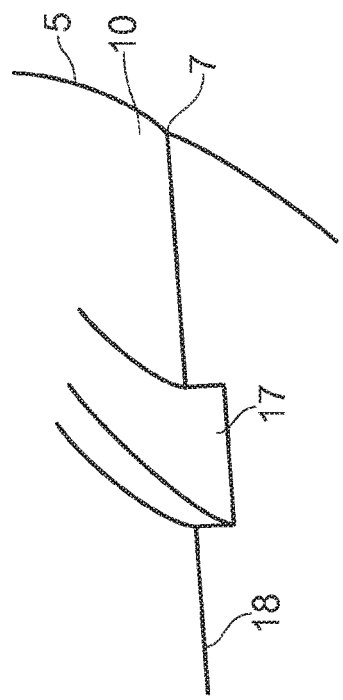
Figure 5C:
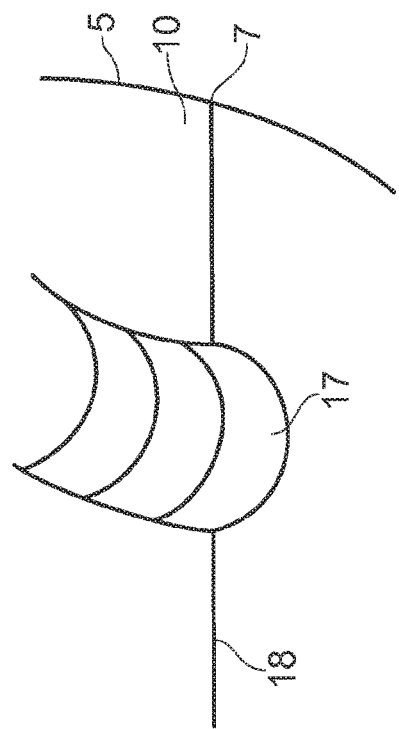
Figure 5D:
Figure 6A:
FIGS. 6A to 6D illustrate different types of textured surfaces which may be incorporated into the relief surface.
Figure 6B:
Figure 6C:
Figure 6D:

FIG. 4A shows a groove with one smooth side and an opposing zig/zag side. This side may for example be aligned with the cutting edge side of the groove to maximise heat transfer. It may also cause turbulence within the groove further enhancing heat transfer. FIG. 4B shows a groove with opposing zig-zag side walls. FIG. 4C shows a smooth curved groove and FIG. 4D shows a serpentine or sinusoidal shape. These may enhance fluid flow.

It will be recognised that multiple grooves may be formed in the relief surface as shown in FIG. 3A to 3E and as described above. Each groove need not be the same, for example the grooves closer to the cutting edge may be adapted to maximise heat transfer and grooves closer to the trailing edge adapted to maximise flow rate.

FIGS. 5A to 5D show examples of the cross-sectional shape of each groove may have. The figures show a semi-circular, triangular, asymmetrical curve and a rectangular cross-section. It will be recognised that other shapes may be used.

Although the present example is shown to have only one groove 17, more than one groove 17 may be used in each cutting portion 3, as discussed above. All modifications and variations discussed above with respect to the single groove 17 also apply to any additional grooves 17.

FIGS. 6A to 6D illustrate different types of textured surfaces which may be incorporated into the primary relief surface 10 or the secondary relief surface 11 instead of using grooves. In each example a portion of the textured surface extends above the mean dotted line and a portion extends below it. A variety of surface shapes may be used as illustrated (but not restricted to) the examples shown in FIGS. 6A to 6D. These complex shapes may conveniently be formed using additive manufacturing techniques.

When in use, the drill bit 1 is caused to rotate by a rotating drill bit holder which is attached to the shank 21 of the drill bit 1. In the present example shown in the figures, when viewing the tip surface 8 of the drill bit 1, the rotation occurs in an anti-clockwise direction. In other examples, rotation can occur in a clockwise direction if the position of the cutting edge 5 and the trailing edge 9 are reversed.

In the present example, cutting media is caused to travel through the channel 13 which extends through the length of the cutting portion 3. This is achieved by the cutting media being pumped through the drill bit holder into the shank 21. In existing tools, the direction the cutting media travels in after exiting the channel 13 is not controlled. In the present example, upon reaching the opening 14 of the channel 13, the cutting media travels through the groove 17 (or grooves). Cutting media such as cutting fluid (which may be water based) are well known in the art of machining.

In other examples, instead of carrying the cutting media through a channel 13 up the length of the cutting portion 3, it is directed from a side of the drill bit 1 at the tip surface 8 of the drill bit 1 and into the groove 17 (or grooves).

As discussed above, due to the groove or grooves 17 which extend along the primary relief surface 10, more cutting media will be transported in the region under greatest mechanical and thermal stress than in conventional drill bits, i.e. the cutting edge 5 and specifically the corner edge 7. This will mean that less of the cutting media leaves the cutting zone in a direction away from the cutting edge than in conventional drill bits. Therefore, heat dissipation will be improved compared to conventional drill bits. Furthermore, due to the positioning of the groove 17 (or grooves), more cutting media will be directed at the first margin than in conventional drill bits in order to dissipate heat. Furthermore, the cutting media will act as a lubricant between the first margin 15 and the workpiece 20.

In the present example, the grooves are incorporated into an existing conventional drill tip. This may be achieved using laser cutting for example. In other examples, the grooves may be formed by grinding. In still other examples, the drill bit 1 may be manufactured from first principles with the grooves incorporated in the drill bit by CNC machining. Alternatively the tool may be formed from:

Solid cemented carbide bar stock;
Powder pressed (short drill bits) to almost final shape intended for clamping in a hydraulic/shrink fit/"mechanical" collet or otherwise "embracing" concept for drill bits with a round section; or clamped by means of a screw pressing the drill bit towards a mounting surface (non round drill bits);
Pressing a green body directly, machining the body to form the tool prior to sintering and then finally sintering the tool;
Drill bits soldered to a steel shaft;
Such drill bits may also look like what is sometimes referred to as "spade drills" (flat drill bits);
With non-conventional machining, it can also be materials like ceramics, (polycrystalline) diamond, and cubic boron nitride.

As discussed above, the cutting tool may be made of any suitable material. For example, cemented carbide or other powder based materials or high speed steel. As discussed above the tooling may advantageously be formed using additive manufacturing concepts including a combination of combined concepts with (for example) soldered drill bits soldered to a steel shaft The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/ or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A cutting tool comprising:
at least one cutting portion;
at least one cutting edge extending radially from a center of the tool to a corner edge of the cutting portion at a periphery of the tool; and
at least one relief surface adjacent to the cutting edge;
wherein the relief surface is arranged to provide clearance behind the cutting edge between the cutting tool and a workpiece;
wherein the relief surface adjacent the cutting edge comprises one or more grooves arranged to communicate, in use, a cutting media across the relief surface;
wherein at least one of the grooves intersects with a radially outermost periphery of the relief surface;
wherein the cutting tool comprises a proximal end for connection to a drive mechanism and a distal cutting tip, the distal cutting tip comprising the at least one cutting portion, wherein the cutting edge forms a leading part of the at least one cutting portion and extends from a central region of the distal cutting tip to intersect with the periphery of the cutting tool;
wherein the at least one cutting portion further comprises a substantially helical flute extending from the distal cutting tip towards the proximal portion and adapted in use to communicate material from the cutting edge away from the distal cutting tip;
wherein the helical flute further comprises a primary margin arranged along a periphery of the helical flute;
wherein the cutting tool comprises one or more channels extending through the cutting tool from the proximal end to the distal tip and configured to communicate, in use, the cutting media to the relief surface of the cutting tool;
wherein each relief surface is sub-divided into a primary relief surface adjacent to the cutting edge and a secondary relief surface adjacent to the primary relief surface; and
wherein a channel opening of the one or more channels intersects with a line of intersection between the primary relief surface and the secondary relief surface.

2. The cutting tool of claim 1, wherein the intersection between a cutting edge and the periphery of the cutting tool defines a corner of the at least one cutting portion.

3. The cutting tool of claim 1, wherein at least one groove of the one or more grooves intersects with the channel opening at the at least one relief surface to allow, in use, cutting media to flow from the channel into the at least one groove.

4. The cutting tool of claim 1, wherein the cutting edge defines a leading edge of the at least one cutting portion in a direction of a cutting operation and the secondary relief surface defines a trailing surface in a direction of a cutting operation and wherein the primary relief surface is disposed therebetween.

5. The cutting tool of claim 1, wherein each of the one or more grooves independently intersect with an opening of a channel of the one or more channels to cause cutting media to be distributed between a plurality of grooves.

6. The cutting tool of claim 4, wherein adjacent relief portions in the direction of the cutting operation are incrementally angled with respect to a plane perpendicular to an elongate axis of the cutting tool such that successive relief surfaces have greater angles to the plane than a preceding relief surface.

7. The cutting tool of claim 1, wherein the primary margin is arranged to strengthen the peripheral portion of the flute.

8. The cutting tool of claim 7, wherein the primary margin extends from the corner edge of the at least one cutting portion along the periphery of the helical flute.

9. The cutting tool of claim 1, wherein the at least one cutting portion further comprises a secondary margin, wherein the secondary margin extends substantially parallel to the primary margin and protrudes from a side of a radially outermost surface of a body of the cutting tool and wherein a radial extension of a protrusion of the secondary margin is smaller than or equal to the primary margin.

10. The cutting tool of claim 2, wherein at least one of the grooves intersects with a radially outermost periphery of the at least one relief surface proximate to the corner.

11. The cutting tool of claim 9, wherein at least one of the grooves intersects with a radially outermost surface of a relief portion between the primary and secondary margins.

12. The cutting tool of claim 1, wherein at least one groove of the one or more grooves is arranged to extend away from the cutting edge towards a trailing edge of a relief surface.

13. The cutting tool of claim 1, wherein the cross-sectional shape of at least one groove of the one or more grooves is one of substantially semi-circular, rectangular, or square.

14. The cutting tool of claim 1, wherein a surface roughness of at least one groove of the one or more grooves is non-uniform along at least one of a length or width of the at least one groove.

15. The cutting tool of claim 1, wherein at least a portion of a path of one or more grooves across a relief surface corresponds in shape to the shape of the cutting edge.

16. The cutting tool of claim 1, wherein at least one groove of the one or more grooves has a uniform cross-sectional shape along its length.

17. The cutting tool of claim 1, wherein at least one groove of the one or more grooves has a zig-zag or serpentine profile viewed from an end of the tool.

18. The cutting tool of claim 1, wherein a distance between an edge of at least one groove of the one or more grooves and the cutting edge is no less than a circumferential width of the primary margin.

19. The cutting tool of claim 1, wherein a depth of at least one groove of the one or more grooves into the at least one relief surface is non-uniform along at least part of a length of the at least one groove.

* * * * *